United States Patent [19]

McDonnell et al.

[11] Patent Number: 5,189,534
[45] Date of Patent: Feb. 23, 1993

[54] LIQUID CRYSTAL COLOR DISPLAYS WHICH COOL FROM ISOTROPIC TO TWISTED NEMATIC TO SMECTIC

[75] Inventors: Damien G. McDonnell; Edward P. Raynes; Robert Daley, all of Worcestershire, England

[73] Assignee: The Secretary of State for Defence in Her Britannic Majesty's Government of the United Kingdom of Great Britain and Northern Ireland, London, England

[21] Appl. No.: 603,668
[22] PCT Filed: Mar. 14, 1989
[86] PCT No.: PCT/GB89/00262
§ 371 Date: Oct. 31, 1990
§ 102(e) Date: Oct. 31, 1990
[87] PCT Pub. No.: WO89/09426
PCT Pub. Date: Oct. 5, 1989

[30] Foreign Application Priority Data

Mar. 24, 1988 [GB] United Kingdom ............... 8807090

[51] Int. Cl.$^5$ .................................. G02F 1/13
[52] U.S. Cl. ............................. 359/45; 359/64; 359/90
[58] Field of Search ............ 350/351, 346, 337; 359/90, 45, 64

[56] References Cited

U.S. PATENT DOCUMENTS

| | | | |
|---|---|---|---|
| 4,025,164 | 5/1977 | Doriguzzi et al. | 350/337 |
| 4,068,926 | 1/1978 | Nakamura et al. | 359/64 |
| 4,291,948 | 9/1981 | Crossland et al. | 350/340 |
| 4,497,543 | 2/1985 | Aoki et al. | 350/337 |
| 4,692,779 | 9/1987 | Ando et al. | 350/330 |
| 4,696,550 | 9/1987 | Shionoya | 350/351 |
| 4,701,029 | 10/1987 | Crossland et al. | 350/351 |
| 4,751,509 | 6/1988 | Kubota et al. | 350/351 |

FOREIGN PATENT DOCUMENTS

2848581 5/1979 Fed. Rep. of Germany.
2079484B 1/1982 United Kingdom.

OTHER PUBLICATIONS

Raynes, "Cholesteric Texture and Phase Charge Effects", *Nonemissive Electrooptic Displays*, ed. Kmetz, Plenum Press, N.Y. 1976.
IBM Technical Disclosure Bulletin, vol. 19, No. 5, Oct. 1976, G. J. Sprokel: "Twisted Smectic Storage Display Cells", p. 1888.
Optical Engineering, vol. 23, No. 3, May–Jun. 1984, A. G. Dewey: "Laser-Addressed Liquid Crystal Displays", pp. 230–240.

*Primary Examiner*—William L. Sikes
*Assistant Examiner*—Anita Pellman Gross
*Attorney, Agent, or Firm*—Nixon & Vanderhye

[57] ABSTRACT

A color display formed of information of one color on a different color background is projected onto a screen. Light from the bulb is passed serially through a neutral polarizer, a smectic liquid crystal cell, and a further polarizer. The cell comprises a smectic liquid crystal material incorporating an amount of a cholesteric material and a dye contained between two cell walls carrying electrodes and surface treated to give a molecular twist and alignment to the liquid crystal material. Information is written into the cell by scanning the laser beam over the cell, causing localized heating, in combination with or without an applied electric field to form selected areas with a twisted structure on a background of homeotropic structure, or vice versa. Thus plane polarized light is passed through the cell with its plane selectively rotated or non rotated. This provides a two color display of information of one color on a background of the other color. Alternatively the two colored polarizers may be replaced by a single neutral or colored polarizer to give a black and white or colored and white display. The display system may be replicated using differently colored polarizers and the resulting images combined into a multi color image on a single screen.

10 Claims, 3 Drawing Sheets

LIQUID CRYSTAL COLOR DISPLAYS WHICH COOL FROM ISOTROPIC TO TWISTED NEMATIC TO SMECTIC

BACKGROUND OF THE INVENTION

1. Field of the Invention

This invention relates to liquid crystal colour displays in which information is displayed in one colour on a background of another colour.

2. Discussion of Prior Art

One known form of colour display uses a smectic liquid crystal material addressed by a laser in projection displays and digital storage devices; see for example F. J. Kahn, Applied Physics Letters, 22, p. 111 (1973); A. G. Dewey, Optical Engineering, Vol. 23, No. 3, p. 230 (1984); and H. Birecki et al, SPIE Proceedings Vol. 420 edited by A. E. Bell and A. A. Jamberdino (1983).

A typical projection display with smectic liquid crystal materials uses a scattering and a transmissive state of the smectic material to provide a display. Both the light scattering and transmissive states can be stable and co-exist in different parts of a display at the same time. Information is written as areas of light scattering texture on a background of light transmissive texture i.e. dark features on a light background; or visa versa. The display is monochrome. Multi-colour may be provided by using a plurality of systems, each with an associated filter, and combining the outputs say on a screen. This is quite complicated and expensive. The displays need a small highly localised light source, e.g. an arc lamp, and Schlieren stop optics. These are wasteful of power and make it difficult to obtain adequate display brightness.

SUMMARY OF THE INVENTION

According to this invention these difficulties are overcome by providing a two colour display using a single cell of smectic material arranged as a polarisation switch together with coloured polarisers. The two colours may be black, considered as a colour or absence of light, and white, considered as a colour or the absence of other colours; or two colours such as red and green.

According to this invention a liquid crystal colour display comprises a smectic liquid crystal cell formed of a layer of smectic liquid crystal material located between two cell walls both coated with sheet electrodes for applying an electric field across the smectic material layer, a light source for illuminating the cell, a lens system for directing light from the light source via the cell to a display screen, a laser light source for locally heating the cell, and a scanning system for scanning laser light across the cell, characterised by:

a cell in which the smectic material has a nematic phase between the smectic and isotropic phase, a homogeneous surface alignment treatment to the facing surfaces of the cell walls, the alignment direction on one wall being at least 45° to that on the other wall, a neutral plane polariser between the light source and cell, at least one polariser positioned to receive light from the cell, the arrangement being such that liquid crystal material cooling rapidly from the isotropic state in the absence of an applied electric field adopts a twisted light rotating configuration, and in cooling from the isotropic state in the presence of an electric field adopts a non-rotating configuration whereby the two polarisers and the two different liquid crystal configurations cooperate to display information in one colour on the background of the other colour.

The polariser receiving light from the cell may be a neutral grey polariser, in which case a black and white display is produced; a non-black coloured polariser alone, in which case a non-black colour and white display is produced; or two different non-black coloured polarisers may be used to produce a display of two different colours with information of one colour on the background of the other colour.

The two coloured polariser are preferably arranged with their optic axis orthogonal to one another and orthogonal or parallel to the alignment direction on the nearest cell wall.

A small amount of cholesteric material, e.g. 0.1 to 10% wt., may be dissolved in the smectic material to assist in providing a uniform twist direction.

The alignment direction on the cell walls may be 90°+/−10° preferably +/−5° or less.

A small amount of a dye, absorbing to the laser wavelength, may be dissolved in the liquid crystal material.

The light source is preferably an incandescent filament bulb such as a halogen bulb, backed by a reflector.

BRIEF DESCRIPTION OF THE DRAWINGS

The invention will now be described, by way of example only, with reference to the accompanying drawings of which.

DETAILED DISCUSSION OF 4 PREFERRED EMBODIMENTS

Figure 1:
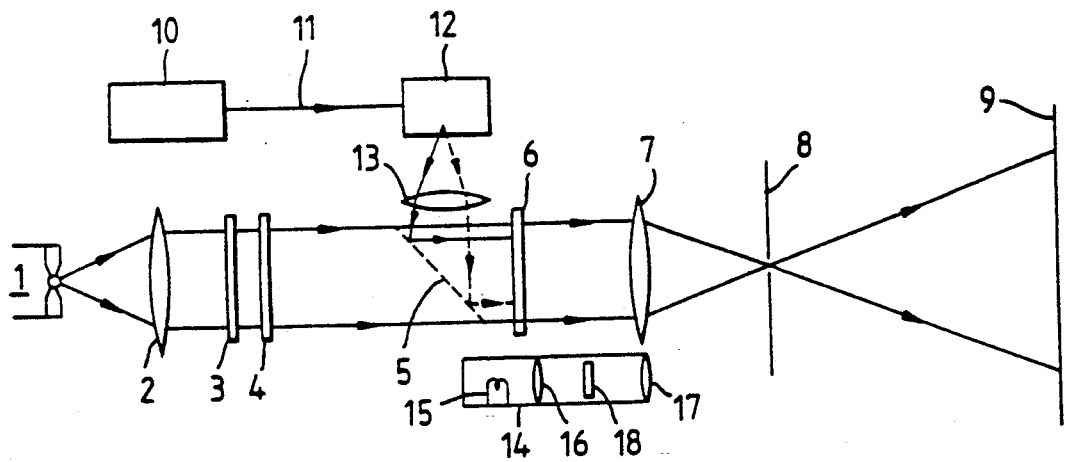
FIG. 1 is a schematic layout of a prior art system providing a monochrome display.

The prior art projection system shown in FIG. 1 comprises in serial order a mercury arc lamp 1, a condensor lens 2, UV and infra red filters 3, 4, a dichroic beam combiner 5, liquid crystal cell 6, projector lens 7, a Schlieren stop 8, and a forward scattering screen 9. Additionally a He-Ne laser 10 has its light beam 11 scanned in both an x and a y direction by a two mirror system, shown in outline only at 12, via a scan lens 13 onto the dichroic beam combiner 5 and thence on the cell 6. This system is usefully combined with a second projection system 14, such as a map display, whose output is focussed onto the screen 9. The map display comprises a light source 15, two lenses 16, and 17, together with a slide holder 18 carrying a slide of a map.

The mercury arc lamp 1 is a 350 W lamp giving as close to a point source as possible so that the cell 6 is illuminated with a collimated beam of light. The cell 6 is highly scattering so that it is neccessary to removed unwanted scattered light by the Schlieren stop 8. This requires a small point source of projector light which makes the system inefficient. Thus for viewing in conditions of high ambient light it is difficult to obtain an adequately bright display.

Figure 2:
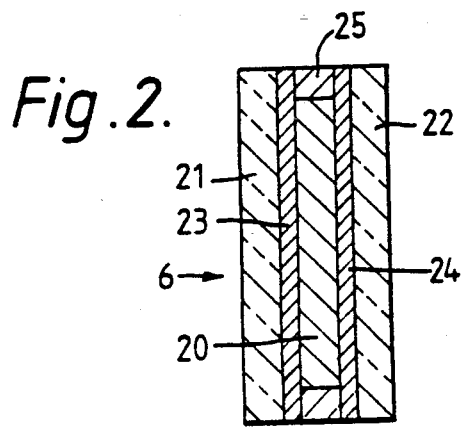
FIG. 2 is a sectional view of the cell used in FIG. 1.

The cell FIG. 2, comprises a 12 μm thick layer of S2 (BDH material) located between two glass walls 21, 22. A small amount of dye is disolved in the material to absorb the laser radiation and hence produce localised heating in the layer 20. The inner surface of each wall is coated with a transparent electrically conducting coating of indium tin oxide 23, 24. These are used to apply an electric field across the layer 20, and may also be used as resistance heaters to maintain the layer temperature at a desired value. Both walls 21, 22 are treated to give a homeotropic alignment to contacting liquid crystal molecules, this imparts a tendency for the contacting molecules to order themselves perpendicular to the walls.

The dichroic beam combiner 5 is reflecting to the HeNe laser wavelength and also to red wavelengths from the lamp 1; the latter is to avoid unwanted heating of the cell. Unfortunately there still exists an undesired temperature gradient across the cell due to the non uniform light output from the arc lamp 1. The combiner 5 is transparent to all other visible wavelengths from the lamp.

Typically the laser is of 8 mW output which gives a writing speed of about 1 m/s on the screen.

Figure 3:
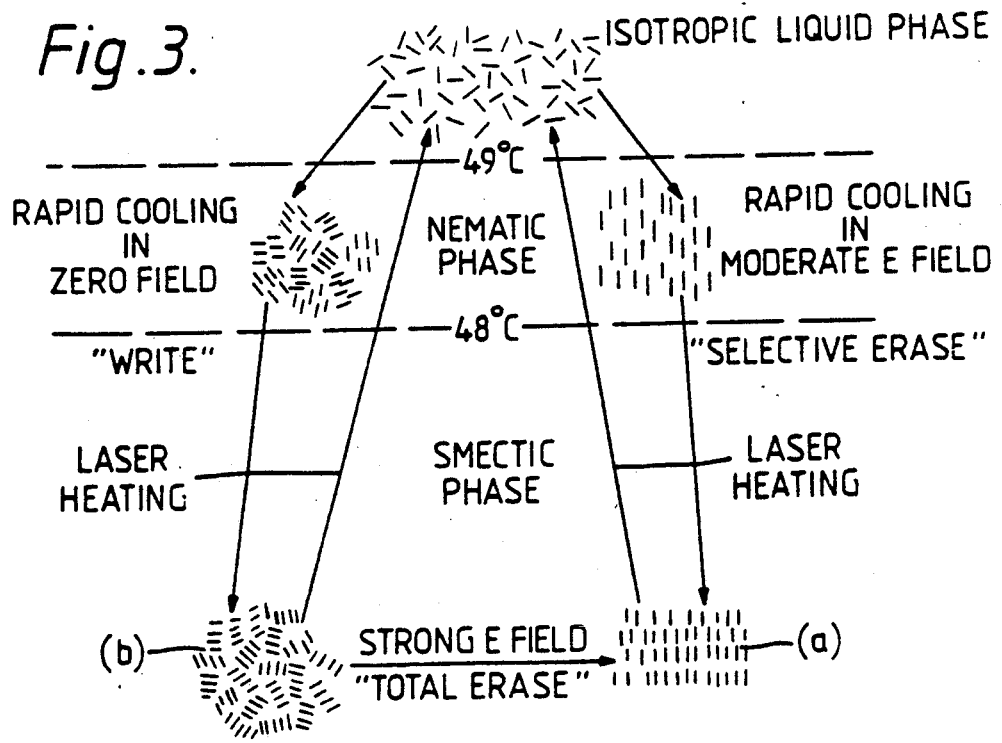
FIG. 3 is a phase diagram for material in the system of FIG. 1.

Information is displayed on the screen 9 by causing areas of the layer 20 to become light scattering on a transparent background, or vice versa. This is explained with reference to FIG. 3.

It is a feature of smectic A type liquid crystal materials such as S2, that they can exist indefinitely in either of two states or textures;

(a) a clear state in which the optic axis is aligned uniformly perpendicular to the walls; and (b) a dense scattering, spherulitic focal conic state, in which the spatial extent of aligned regions is small typically about 1 μm.

For S2 material a phase transition between smectic and nematic phases occurs at 48° C., and a further phase change between nematic and isotropic occurs at 49° C.

Application of a strong A.C. electric field, e.g. above $5 \times 10^6$ Vm$^{-1}$ will change the texture from scattering to clear in the smectic phase. Localised heating of the layer 20 onto the isotropic phase is achieved by absorption of laser radiation in the layer 20. This isotropic phase is a disordered structure and is the result of heating either the scattering or clear smectic textures above the 49° C. transition temperature.

From the isotropic phase two routes are possible. Rapid natural cooling from the isotropic through the nematic to the smectic phase results in the scattering texture (b). Rapid natural cooling in the presence of a moderate electrical field of about $5 \times 10^5$ Vm$^{-1}$ results in a clear smectic texture (a). Thus areas of scattering texture and areas of clear texture are obtained by localised heating with the laser 10 and cooling with selective application of an applied electric field. This is used to selectively write and erase information onto the screen. Erasure of the whole cell 6 is obtained by application of the high field to the layer 20.

The display on the screen is monochromatic, i.e. light and dark features in a single colour. Multicolour can be achieved by using a plurality of the systems of FIG. 1 in combination with different colour filters arranged between the cell 66 and Schlieren stop 8. This is costly and needs accurate alignment of all systems to provide a multicoloured display.

Figure 4:
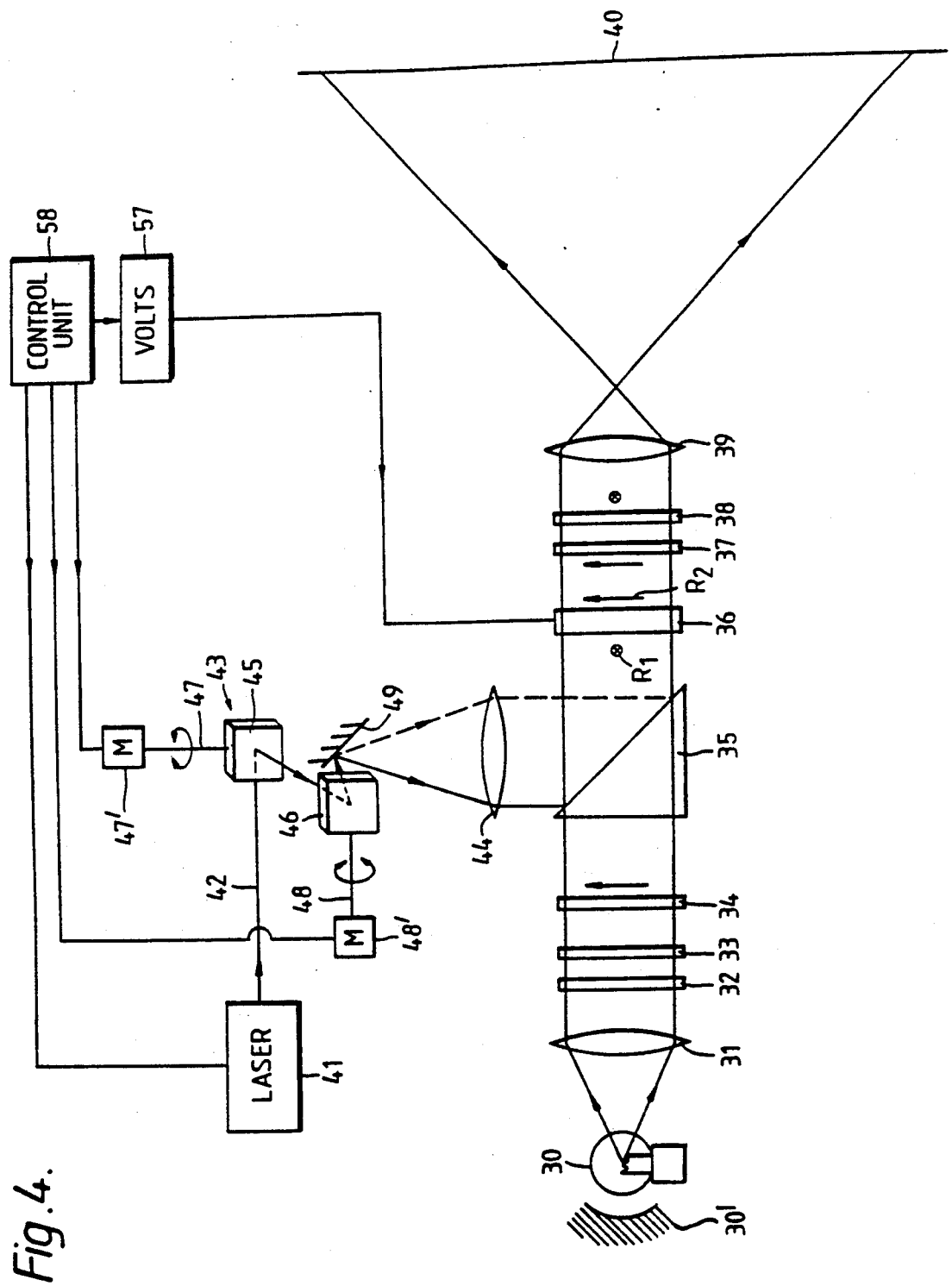
FIG. 4 is a schematic layout of a two colour display according to the present invention.

A two colour system of this invention is shown in FIGS. 4 to 7. FIG. 4 shows a layout similar to that of FIG. 1. However, the lamp 30 is a conventional incandescent filament projector bulb and reflector 30' since it not necessary to use a point source bulb. Also no Schlieren stop is needed. Light from the lamp 30 is directed by a condensor lens 31 through UV and IR filters 32, 33 and a neutral polariser 34 arranged with its polarisation axis vertical. After the polariser 34 light passes through a dichroic beam combiner 35, a liquid crystal cell 36, a first colour polariser 37, a second colour polariser 38, and projection lens 39 onto a screen 40. The first colour polariser 37 is arranged with its polarisation axis vertical whilst that of the second colour polariser 38 is horizontal. The coloured polarisers may be red and green polarisers respectively. An advantage of the lamp 30 is that it provides a reasonably uniform temperature gradient across the liquid crystal cell 36. This makes laser addressing easier because the cell can be operated nearer to the nematic phase transition and lower power lasers used for addressing.

As in FIG. 1 a He-Ne laser 41 has its output beam 42 directed via a two mirror system 43, scan lens 44, and the dichroic combiner 35 onto the cell 36.

This two mirror system 42 comprises two mirrors 45, 46 rotatable about orthogonal axes 47, 48 by motors 47' and 48' to cause a horizontal and vertical scanning of the laser beam 42 via a fixed mirror 49 onto the cell 36.

Figure 5:
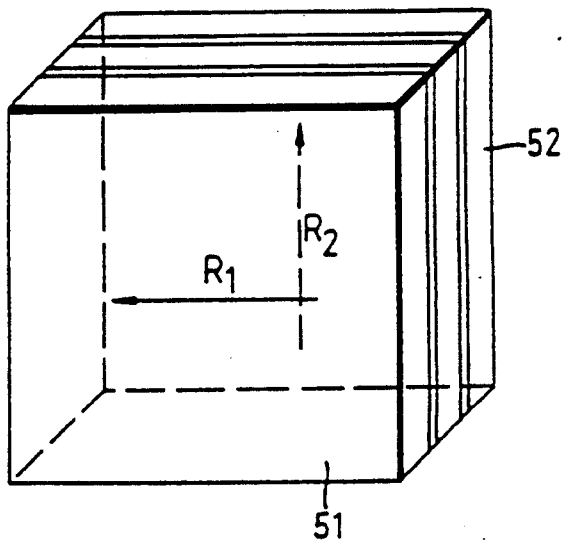
FIG. 5 is a view of the cell used in FIG. 4.
Figure 6:
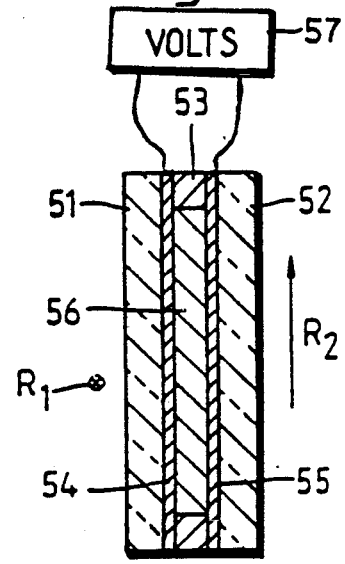
FIG. 6 is a sectional view of the cell in FIG. 5.

The cell 36, FIGS. 5, 6, comprises two glass walls 51, 52, 1.5 mm thick and spaced 12 um apart by a spacer ring 53. The inner surface of both walls are coated with a 1000 Å thick layer of transparent electrically conducting indium tin oxide 54, 55. Prior to assembly the walls are surface treated to provide a homogeneous alignment to liquid crystal molecules in a conventional manner. This alignment may be by oblique evaporation of SiO or coating with a polyimide such as Nolimide 32 (T.M.) and unidirectionally rubbed with a rayon cloth. Such treatment causes alignment of the liquid crystal molecules in a single direction along the rubbing direction. Preferrably one wall is treated by oblique evaporation at 30° angle to give alignment with a zero tilt to contacting liquid crystal molecules; and the other wall is treated by oblique evaporation at about 5° to give alignment with a molecular tilt of about 30°. The walls 51, 52 are assembled so that the alignment directions are orthogonal as indicated by arrows R1, R2. The cell 36 is arranged so that direction R1 on the wall nearest the neutral polariser 34 is horizontal i.e. orthogonal to the optical axis of the neutral polariser 34.

A smectic A liquid crystal material 56 is contained between the walls 51, 52. This material 56 may be S2 BDH material 4-n-alkyl and 4-n-alkyloxy 4'-cyanobiphenyl together with about 1% of C15 BDH cholesteric material (—)-4-(2Methylbutyloxy) 4'-cyanobiphenyl. Other suitable materials are BDH materials catalogue numbers S1, and S3 to S6. A small amount e.g. up to 5%, typically 2% of a dye is added to absorb the laser radiation and cause localised heating in the smectic layer 56. Suitable dyes are as described in an article by F. C. Saunders et al IEEE Transactions on Electron Devices, Vol. E-D30, No. 5 p. 499 (1983). A dye suitable for use with a laser operating in the near infra-red is described in (U.K. P.A. 8323359), e.g. a nickel dithiene derivative dye such as the ICI dye number SC100870.

A voltage source 57 is arranged to supply voltages to the electrodes 54, 55. Control of the scan mirrors 45, 46, and laser 41, and voltages from the voltage source 57 is from a control unit 58. This may contain standard routines for scanning conventional symbols onto the cell 36.

Figure 7:
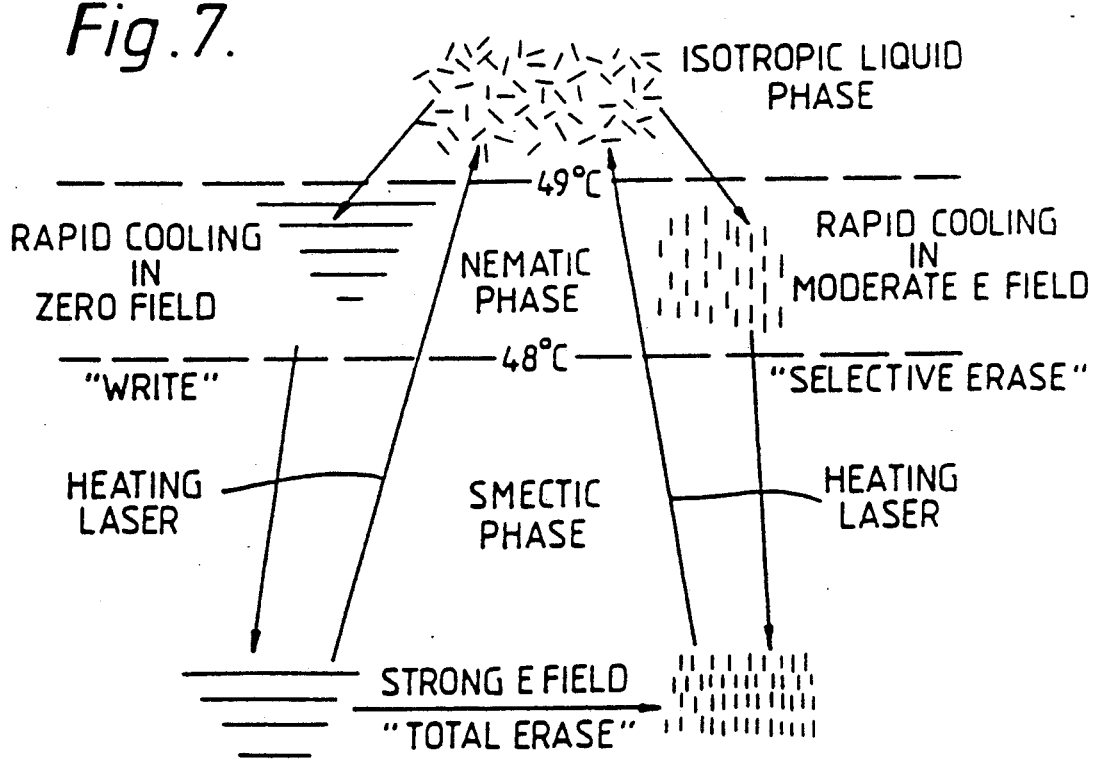
FIG. 7 is a phase diagram for material in the system of FIG. 4.

As shown in FIG. 7 a cell filled with S2 and C15 has a smecticnematic phase transition at 48° C., and a nematic-isotropic phase transition at 49° C. On cooling from the isotropic phase in the absence of an applied electric field this material adopts a twisted nematic state in the nematic phase. This twist is induced by the orthogonal surface alignments R1, R2. The cholesteric material C15 ensures a uniform twist direction. On further cooling from the nematic to smectic phase without an applied electric field, the material retains its twisted structure in the smectic phase. Such a twisted structure is optically active; it rotates the plane of incident plane polarised light by 90° and is similar to the known twisted nematic effect.

Cooling the material from the isotropic, through nematic, to the smectic phase in the presence of an applied electric field of about $5 \times 10^5$ Vm$^{-1}$ causes the material to adopt the clear texture with the molecules aligning perpendicular to the walls 51, 52.

Both the twisted structure and clear structure can be locally heated into the isotropic state by laser heating. The twisted texture can be changed into the clear texture by application of a strong electric field e.g. above $5 \times 10^6$ Vm$^{-1}$.

In operation for example a red colour is obtained on the screen 40 when the cell 36 is in its clear texture. Light from the lamp 30 is vertically polarised by the neutral polariser 34, passes unchanged through the cell 36 to be filtered by the red polariser 37 so that only red light passes to the screen 40. When the cell 36 is in its rotated texture vertically polarised light from the neutral polariser 34 is rotated by the cell 36 to emerge horizontally polarised. This horizontally polarised light is filtered by the green polariser 38 to illuminate the screen 40 with green light.

Thus the laser beam 42 is scanned over the cell 36 without any applied voltage so that areas of smectic material adopt a twisted texture in a clear background. This gives green areas on a red background, where the green areas are shaped to give information such as numbers, letters, or symbols. These green areas may be selectively erased by scanning the laser beam 42 over them and applying a moderate electric field as the locally heated material cools into the clear texture.

Alternatively the display can be red on a green background. In this case the whole cell 36 is changed into the twisted texture and the laser beam 42 scanned over the cell 36 in the presence of a moderate electric field. Areas of clear texture are thus formed on a background of twisted texture in the layer 56. The colours may also be reversed by reversing the relative position of the red and green coloured polarisers 37, 38 or by rotating their optical axes by 90°.

Other colours and combinations are obtained by use of different colour polarisers.

More than two colours may be obtained by replacing the two colour polarisers with a multi colour switch as described in GB 1,469,638.

For example the two colours black and white may be obtained by replacing the two coloured polarisers 37, 38 with a single neutral polariser aligned parallel or orthogonal to the plane of light emerging from the cell 36. Alternatively a coloured, e.g. red, and white display may be obtained using e.g. a red polariser. A coloured e.g. blue and black e.g. zero light, may be obtained using a blue polariser and a neutral polariser arranged with their optical axis orthogonal to one another as in FIG. 4.

Thus a three colour, red, green, and blue display may be obtained using two cells 36 side by side along different optical paths and combining the two paths onto a screen. One such cell may provide the red and green colour, and the other cell blue and black (absence of light). Alternatively three colours may be obtained using three cells arranged along three different optical paths. Each cell has associated therewith two polarisers, one a neutral polariser to give black (no light) and a coloured polariser. The three optical paths are combined to give a single image on the screen 40. For example the arrangement of FIG. 4 can be replicated three times, with different colour polarisers, the resulting three images combined on the screen 40 into a single multicolour image. Such three colour displays are more efficient than the prior art because the light source is a conventional, incandescent filament, bulb and no Schlieren stop is needed.

We claim:
1. A liquid crystal colour display comprising:
    a smectic liquid crystal cell, said cell comprising:
        two cell walls, each of said walls coated with a sheet electrode for applying an electric field across the cell;
        a smectic liquid crystal material layer located between said walls, said liquid crystal material having a nematic phase between smectic and isotropic phases; and
        a homogeneous surface alignment treatment on said cell walls, the alignment direction on one wall being at least 45° to the alignment direction on the other wall,
    a light source for illuminating the cell,
    a lens system for directing light from the light source via the cell to a display screen,
    a laser light source for locally heating at least a portion of said liquid crystal material to an isotropic phase
    a scanning system for scanning laser light across the cell,
    a neutral plane polariser between said light source and said cell, and
    at least one polariser positioned to receive light from the cell, said laser light source, said surface alignment treatment, and said cell walls comprising a means for cooling said liquid crystal material rapidly from an isotropic state and for causing the liquid crystal material to adopt a twisted light rotating configuration in the absence of an applied electric field, and for causing the liquid crystal material to adopt a non-rotating configuration in the presence of an electric field.

2. The display of claim 1 wherein the alignment directions on the cell walls are 90° plus or minus 10° to one another.

3. The display of claim 1 wherein up to 10% of a cholesteric material is incorporated in the smectic liquid crystal material.

4. The display of claim 1 wherein the polariser positioned to receive light from the cell is a single neutral polariser.

5. The display of claim 1 wherein the polariser positioned to receive light from the cell is a single coloured polariser.

6. The display of claim 1 wherein the polariser positioned to receive light form the cell is formed by a neutral polariser and a coloured polariser.

7. The display of claim 1 wherein the polariser positioned to receive light from the cell is formed by two different colour polarisers.

8. The display of claim 1 wherein the light source is an incandescent filament bulb.

9. The display of claim 1 wherein an amount of an infra red radiation absorbing dye is incorporated in the liquid crystal material.

10. A liquid crystal color display comprising:
(a) a plurality of smectic liquid crystal cells, one associated with each color to be displayed, each of said cells comprising:
  two cell walls, each of said walls coated with a sheet electrode for applying an electric field across the cell;
  a smectic liquid crystal material layer located between said walls, said liquid crystal material having a nematic phase between smectic and isotropic phases; and
  a homogeneous surface alignment treatment on said cell walls, the alignment direction on one wall being at least 45° to the alignment direction on the other wall;
(b) at least one light source for illuminating said cells;
(c) at least one lens system for directing light from the light source via said cells to a display screen;
(d) at least one laser light source for locally heating at least a portion of said liquid crystal material to an isotropic phase in at least one of said cells;
(e) at least one scanning system for scanning laser light across said cells;
(f) a plurality of neutral plane polarisers, one associated with each of said cells and located between said light source and said cell; and
(g) a plurality of polarisers, at least one polariser associated with each cell and positioned to receive light from the cell, wherein said laser light source, said surface alignment treatment, and said cell walls associated with each of said cells comprising a means, associated with each cell, for cooling said liquid crystal material rapidly from an isotropic state and for causing the liquid crystal material to adopt a twisted light rotating configuration in the absence of an applied electric field, and for causing the liquid crystal material to adopt a non-rotating configuration in the presence of an electric field.

* * * * *